United States Patent [19]

Sugisawa et al.

[11] Patent Number: 4,585,660

[45] Date of Patent: Apr. 29, 1986

[54] DECOMPRESSION OIL-FRYING METHOD FOR FOOD PRODUCTS

[75] Inventors: Ko Sugisawa; Yasushi Matsumura, both of Nara; Kazumitsu Taga, Neyagawa, all of Japan

[73] Assignee: House Food Industrial Co., Ltd., Osaka, Japan

[21] Appl. No.: 773,841

[22] Filed: Sep. 6, 1985

Related U.S. Application Data

[63] Continuation-in-part of Ser. No. 531,279, Sep. 12, 1983, abandoned.

[30] Foreign Application Priority Data

Feb. 25, 1983 [JP] Japan .................................. 58-31692

[51] Int. Cl.$^4$ ............................................. A23L 1/212
[52] U.S. Cl. .................................... 426/438; 426/439; 426/445
[58] Field of Search ............... 426/438, 445, 640, 660, 426/616, 439, 641

[56] References Cited

U.S. PATENT DOCUMENTS 4,242,365 12/1980 Numata et al. ...................... 426/438

Primary Examiner—George Yeung
Attorney, Agent, or Firm—Harry M. Weiss & Associates

[57] ABSTRACT

A quick decompression oil-frying method for producing food products. The method comprises uniformly heating a food material to a suitable temperature in an atmosphere of a pressure which ranges between normal pressure and a raised pressure, rapidly decompressing the atmosphere to such a low pressure that the water contained in the food material is evaporated at a temperature below the temperature of the food material and at such a rate as to permit the expansion of the food material, drying the food material in an oil of a temperature substantially equal to the temperature of the food material and restoring the normal pressure.

16 Claims, 2 Drawing Figures

DECOMPRESSION OIL-FRYING METHOD FOR FOOD PRODUCTS

This is a continuation-in-part of application Ser. No. 531,279, filed Sept. 12, 1983, now abandoned.

BACKGROUND OF THE INVENTION (1) Field of the Invention

The present invention relates to a method for producing expanded foodstuff by a quick-decompression oil-frying method.

More particularly, the invention is concerned with a quick decompression oil-frying method for producing food products, having the steps of uniformly heating a material food to a suitable temperature in an atmosphere of a pressure which ranges between the normal pressure and a raised pressure, rapidly decompressing the atmosphere to such a low pressure that the water contained in the food material is evaporated at a temperature below the temperature of the food material and at such a rate as to permit the expansion of the food material, frying the food material in an oil of a temperature substantially equal to the temperature of the food material and restoring normal pressure.

(2) Description of the Prior Art

Hitherto, various methods have been proposed and actually used for drying food products, such as the hot-air drying method, microwave drying method, freeze-drying method, vacuum drying method, oil-drying method and so forth. The oil-frying method can be further divided into the oil-frying method under normal pressure and the oil-frying method under reduced pressure.

The oil-frying method under reduced pressure, referred to as the "decompression oil-frying method" hereinunder, is conducted in the following manners.

For instance, the specification of U.S. Pat. No. 3,962,355 discloses a process for producing a dry fried snack food from apples. According to this process, the apple is sliced and dipped in a sugary liquid and, after being dried by hot air until the water content is decreased to 6 to 8%, is fried in oil under a reduced pressure of 0 to 160 mmHg.

The specification of U.S. Pat. No. 3,868,466 discloses an invention concerning a product from citron rind. More specifically, this process consists of dipping raw unfrozen rind in a hot vegetable oil heated to 220° to 400° F. long enough to evaporate most of the water content. Then, the rind is exposed to a vacuum together with the oil to decrease the water content down to 15% or less and then the vacuum is broken.

Thus, in the known vacuum oil-frying methods, the food to be fried is put in a decompressed oil-frying apparatus containing an oil of a temperature higher than the food so that the food is heated from the outside thereof by the heat of the oil, up to the boiling point of the water under the reduced pressure so that the food is dried.

In these known methods in which the food temperature is raised by the heat applied externally from the ambient oil, it is not possible to equally heat the surface region and the core region of the food rapidly, the difference in the drying speed between the surface region and the core region further depending on the shape of the food. Consequently, the surface region of the food reaches the water boiling point under the reduced pressure earlier than the core region of the same, so that the evaporation is commenced first at the surface of the food, while the core portion of the food is still below the boiling point. Therefore, an unbalance in water content occurs between the surface region and the core region with the evaporation or dispersion of the water not being made or being made only insufficiently in the core region of the food. As the drying of the food proceeds in this manner, hardening as a result of the drying takes place first in the surface region, to further hinder the dispersion and evaporation of the water in the core region of the food. Consequently, an impractically long time and high oil temperature are required for completely evaporating the water from the core region of the food. This not only results in scorching in the surface but also impairs the uniform drying of the food. Generally, those foods which are three-dimensionally bulky or foods which have high densities suffer most from the above-described problem, and this problem becomes more serious as the bulk or the density of the food increases.

The present invention aims at overcoming the above-described problem of the prior art.

SUMMARY OF THE INVENTION

Accordingly, it is a primary object of the invention to provide a method of producing foodstuffs by drying through oil-frying, improved to ensure a substantially uniform evaporation and dispersion of the water throughout the entire portion of the food material.

To this end, according to the invention, there is provided a decompressed oil-frying method for food products which comprises the following steps:

(a) uniformly heating a food material under a first pressure $P_1$ between atmospheric pressure and a pressure higher than atmospheric pressure, up to a temperature $T_1$ which is lower than the boiling point of water under the first pressure $P_1$;

(b) rapidly decompressing the first pressure $P_1$ down to a second pressure $P_2$ under which the boiling point of water in the food material is below the temperature $T_1$;

(c) frying the food material in an oil held at a temperature $T_2$ substantially equal to the temperature $T_1$; and (d) restoring atmospheric pressure around the food material.

The food materials suitably treated by the method of the invention are vegetables, fruits, grains, legumes, doughs consisting mainly of a grain flour, foods containing animal protein, kelp, fungi and other foods which are produced by mixing or processing these material foods. Examples of vegetables suitably used are carrot, Japanese radish, green pepper, asparagus, potato, sweet potato and bamboo shoot, while typical examples of the fruits suitably used are apple, bannana, plum, strawberry, pineapple and so forth. Wheat, rice and corn are typical examples of grains. Soybean, adzuki bean and peas are examples of the legumes. The doughs consisting mainly of grain flour may be for potato chips, noodles, macaroni, spaghetti and so on. Examples of foods containing animal protein are meats such as beef, pork and chicken, cow's milk, eggs and the like. Wakame sea-weed, hijiki (cystphyllum fusi-forme) and tangle are examples of the kelp suitably processed by the method of the invention. Finally, ordinary mushrooms and "shiitake" mushroom are examples of mushrooms suitable for the treatment by the method of the invention. The food materials can also include foods which have been processed to such a degree as not to impair their original forms. Food materials of small size can be directly subjected to the process of the invention, while materials of comparatively large size are preferably cut into pieces of a thickness of less than about 20 mm by a suitable known method, although the invention does not impose any restriction concerning the shape of the food material.

The method of the invention comprises, as its first step, uniform heating of solid food material under normal or raised pressure. The term "uniform heating" in this specification is used to mean heating of all portions of the food material up to a substantially equal temperature. Various known techniques such as hot-air treatment, steaming and boiling can be used for effecting the uniform heating of the food material. However, considering that the food material is to be subjected to an oil-frying step (c), the uniform heating of the food material is preferably effected by immersion in a heated oil (liquid medium) of the same kind as that used in the oil-frying. Essentially, the uniform heating of the food material is up to a temperature which does not cause the evaporation of the water in the food material.

The temperature to which the food material is heated uniformly is determined taking into account various factors such as the type of food material and the final product. For instance, when the final product is required to maintain the flavor of the original food material as in the case of fruit chips, the uniform heating is conducted at a comparatively low temperature. In such a case, therefore, the uniform heating may be effected under a comparatively low pressure approximating atmospheric pressure. On the other hand, when the aroma or flavor produced by the heating is to be stressed as in the case of potato chips or fried chicken, the food material is preferably heated to a temperature exceeding 100° C. In such a case, the pressure under which the uniform heating is conducted may be raised to a level higher than atmospheric pressure.

As stated before, it is essential that the uniform heating occur within a temperature range which does not cause evaporation of the water in the food material. This essential requisite constitutes one of the features indispensable for the constitution of the invention. Table 1 shows examples of such temperatures for various food materials.

TABLE I

| food | condition press. ($P_1$) | uniform heating temp. ($T_1$) |
| --- | --- | --- |
| onion | atm. | 80–100° C. |
| carrot | " | " |
| shiitake (mushroom) | " | 70–100° C. |
| sweet potato | 1.4–1.5 atm. | 80–110° C. |
| potato | 1.7–2.0 atm. | 80–120° C. |
| banana | atm. | 60–100° C. |
| noodle | 3.6–3.7 atm. | 70–140° C. |
| beef | atm. | 50–90° C. |

The temperatures shown in Table 1 above are preferred values and are not exclusive.

The temperature at which the water in the food material is evaporated varies more or less depending on factors such as the components and structure of the food material, as well as the pressure of the atmosphere around the food material. It is, therefore, necessary to investigate beforehand the water evaporation behavior under various pressures, for each of the food material to be used.

During the treatment by the invention, water attached to the outside of the food material is evaporated. Also, so-called cellular free water, which is contained by the food and comparatively easy to remove, is evaporated.

If the uniform heating is carried out up to a temperature above the evaporation temperature, drying undesirably takes place in the surface of the material food to impair the effect of the invention even if the subsequent steps of the method are carried out properly. Therefore, it is not a good method to heat the food material up to temperature above the evaporation temperature.

Thus, in the method of the invention, it is essential that the uniform heating under normal or raised pressure be carried out to heat the food material up to a temperature which is high enough but does not cause the evaporation of the water. In other words, it is not preferred to use too low a heating temperature but, rather, the food material is preferably heated up to a temperature approximating the evaporation temperature. In this way, it is possible to attain efficient drying in the next step only by a slight decompression. Needless to say, a greater degree of expansion can be obtained in some kinds of food by increasing the extent of the decompression.

As stated before, the uniform heating of the food material in the method of the invention may be conducted under a raised pressure. The raised pressur permits the food material to be heated to a temperature higher than 100° C. while suppressing drying. Consequently, it becomes possible to conduct additional processings such as coloring and flavoring of the food to enhance the commercial value of the foodstuff. The uniform heating under raised pressure provides also an advantage that the efficiency of the drying is increased advantageously thanks to the large difference in the pressure between the uniform heating step and the subsequent decompressing step. The large pressure difference results in a large and uniform expansion in some kinds of the food material.

Thus, in the method of the invention, the food material is rapidly decompressed after substantially uniform heating. The decompression is conducted such that the boiling temperature of the water under the reduced pressure is lower than the temperature the food material attained in the preceding step under the normal or raised pressure. Then, the food material is fried in oil under the decompressed pressure. Once the food material is put under the decompressed pressure, the water contained on or in the food material becomes evaporable and begins to be evaporated immediately since the temperature of the food material and, hence, the temperature of the water in the same are higher than the boiling point under the decompressed pressure. To be more exact, the water on or in the surface region of the food material is evaporated rapidly and a part or most of the water in the core region of the material food is moved or diffused to the surface region and then evaporated. Thus, in the frying step of the invention, the evaporation or diffusion of the water takes place substantially simultaneously and equally in every portion of the food material, because the food material has been heated substantially uniformly in the heating step. In consequence, the drying can be completed in a relatively short time without substantial unevenness.

According to the invention, either of two methods can be used for holding the food material under the decompressed condition at a specific temperature.

In one of these, the uniform heating is conducted by dipping the food material in an oil bath and the decompression is effected by decompressing the whole bath as promptly as possible.

In the other method, the food material is uniformly heated by other means than by dipping in oil and is then supplied to an oil bath of a reduced pressure.

The first-mentioned method advantageously permits the use of a vessel common for both of the uniform heating and the oil-frying steps and precludes change of the material food temperature after the uniform heating. However, this method requires a decompression means of a comparatively large capacity, in order to rapidly reduce the pressure in the vessel.

On the other hand, the second-mentioned method does not require decompression means of a large capacity because the pressure in the oil bath is reduced beforehand. However, since the uniform heating is effected by other means than the oil dipping followed by decompression in a separately prepared oil bath, it is necesary to employ at least two kinds of apparatuses. In addition, it is necessary to adopt an additional means for preventing any unevenness of the temperature in the food material during the transfer from the uniform heating means to the oil bath.

From these points of view, the first-mentioned method is preferred to the second-mentioned method, although the lowering of the material temperature during the transfer does not substantially impair the effect of the invention, if such a temperature drop is caused unintentionally.

According to the invention, the decompression to the aimed low pressure is made within 3 minutes preferably within 1 minute. The longer the time required for the decompression, the more gradually the evaporation of water in the decompression step takes place from the surface region of the food material. Thus, hardening as a result of the drying takes place in the surface region. In consequence, the oil-frying time is impractically prolonged and this leads to such disadvantages as an increase in oil absorption and a reduction in the degree of expansion. For this reason, it is not preferred to take a long time for the decompression.

According to the invention, the food material is then fried in the oil as mentioned before. The oil-frying is conducted under such a pressure that the boiling point of water in the food material being fried is below the temperature of the food material by a certain degree which is preferably at least 5° C. Examples of such pressure and temperature of the food material, heated under the conditions of Table 1, are shown in Table 2 below.

TABLE 2

| food | condition | |
|---|---|---|
| | oil-frying press. ($P_2$) | boiling temp. of water in food |
| onion | 526 torr less than | 90° C. less than |
| carrot | 355 torr less than | 80° C. less than |
| Shiitake (mushroom) | " | " |
| sweet potato | 526 torr less than | 90° C. less than |
| potato | " | " |
| banana | 355 torr less than | 80° C. less than |
| noodle | " | " |
| beef | " | " |

It is important that the temperature of the frying oil be substantially equal to the temperature of the food material attained through the uniform heating, because such a temperature condition permits more uniform drying of the food material.

Table 2 shows only such cases in which the decompression is made from a raised pressure or atmospheric pressure to a pressure below the atmospheric pressure. The invention, however, does not exclude decompression from a pressure $P_1$ higher than atmospheric pressure down to another pressure $P_2$ which is still higher than atmospheric pressure, or a decompression from the pressure $P_1$ down to normal pressure $P_2$. Namely, the invention can be carried out either by: effecting a uniform heating at a high pressure $P_1$ above normal pressure, rapidly decompressing to a lower pressure $P_2$ which is still higher than normal pressure and conducting the oil-frying under this reduced pressure, and then restoring the normal pressure or, alternatively, effecting the uniform heating under high pressure $P_1$, rapidly decompressing to normal pressure $P_2$ and conducting the frying at normal pressure $P_2$. In the latter case, the restoration of normal pressure is made simultaneously with the oil-frying.

In the conventional oil-frying method which is conducted under normal pressure, the temperature rise of the food material dipped in the heated oil takes place first in the surface region thereof and, hence, the surface region is dried soon. On the other hand, the temperature rise in the core region of the food material considerably lags behind the temperature rise in the surface region. In consequence, the drying of the food material is rendered non-uniform and, in some cases, undesirable scorching occurs in the surface area. This tendency becomes serious as the temperature difference between the food material and the frying oil is increased.

In contrast to the above, in the method of the invention, the food material is maintained substantially at the same temperature as the frying oil, so that no substantial temperature difference develops between the surface region and the core region of the food material, so that the whole part of the food material can be dried substantially uniformly in quite a short period of time. Thus, the temperature of the food material and the temperature of the frying oil are closely related to each other, in the method of the invention.

The invention, however, does not require strict coincidence of temperature between the food material and the frying oil, and allows a temperature difference in general of not more than about 10° C., although it is preferred to maintain the same within about 5° C.

In the oil drying step in the method of the invention, it is possible to raise the oil temperature slightly in the final period of the fry drying. By so doing, it is possible to impart favourable color and flavor to the surface of the food product. In this case, since the food material has been fried and dried substantially uniformly before the slight temperature rise, no substantial unevenness of the heating is caused on the food surface by the slight temperature rise of the oil, unlike the conventional method.

According to the invention, the pressure of the atmosphere is increased to the normal level from the reduced level by a suitable pressure restoration means, after the oil-frying of the food material. Thereafter, the heating, packing and wrapping steps are carried out as required.

Thus, the fried food products produced by the method of the invention are uniformly dried throughout the entire portion thereof, so that they have uniform taste. In the case of food products which are served after addition of hot water or the like, e.g., instant noodles and their ingredients, they can be prepared for serving with high uniformity.

The method of the invention also permits an expansion of the food at a comparatively low temperature, so that deterioration of the quality of the foodstuff by heat is advantageously minimized. In consequence, it is possible to obtain a large variety of food products including some foodstuffs which could not be realized by the conventional oil-frying method.

Different food materials exhibit different degrees of expansion when treated by the method of the invention. However, expansion was observed more or less accompanying the dehydration in most of the food materials treated by the method of the invention.

The invention will be more fully understood from the following description of the preferred embodiment taken in conjunction with the accompanying drawings.

BRIEF DESCRIPTION OF THE DRAWINGS

FIGS. 1 and 2 are schematic illustrations of apparatuses suitable for use in carrying out the method of the invention in which:

FIG. 1 shows an example of a batch type apparatus; and

FIG. 2 shows an example of a continuous type apparatus.

DESCRIPTION OF THE PREFERRED EMBODIMENTS

Figure 1:
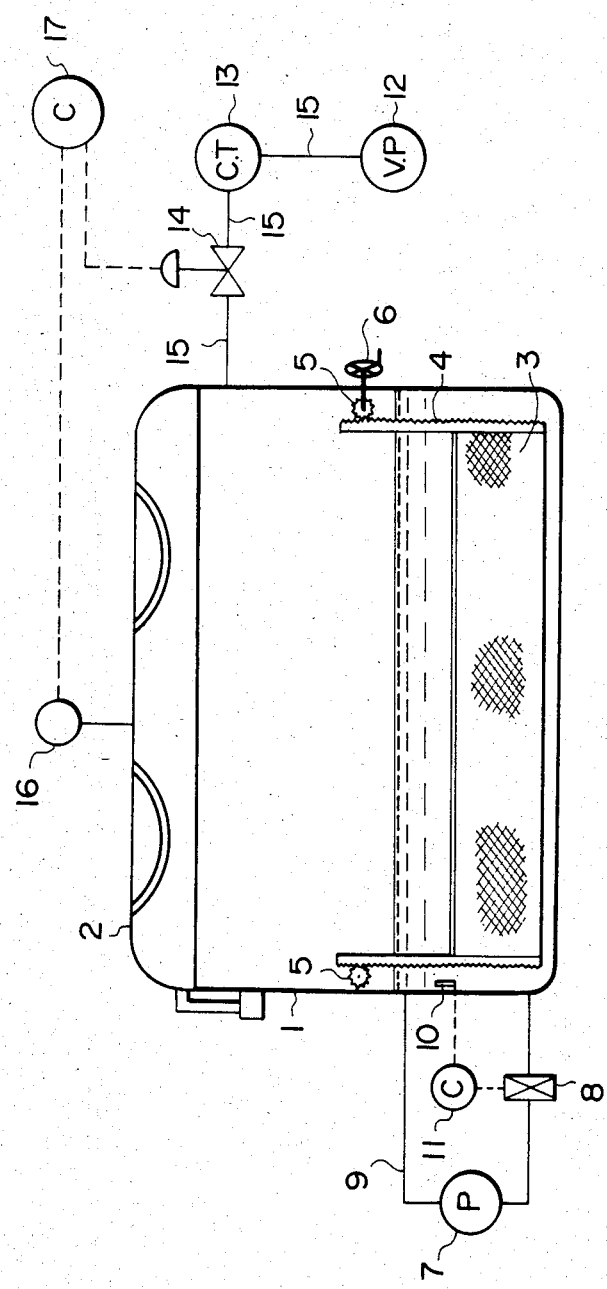

Referring first to FIG. 1 showing a batch type apparatus suitable for use in carrying out the method of the invention, the apparatus has an oil tank 1 having a lid 2 adapted to fit and cover the oil tank 1 hermetically. A retainer 3 with a network-like cover is disposed in the oil tank 1. A rack post 4 provided on the side of the retainer 3 meshes with a gear 5 connected to a handle 6 so that the retainer 3 is movable up and down as the handle 6 is rotated. A circulation pipe 9 is connected to a side wall of the oil tank 1 through a circulation pump 7 for circulating the oil through the tank 1 and a heater 8 for heating the oil. A temperature sensor 10 disposed in the oil tank 10 is connected to the heater 8 through an oil temperature controller 11 adapted to control the oil temperature. A vacuum pump 12, cold trap 13 and a valve 14, connected to the other side wall of the oil tank 1 through a pipe 15, constitutes a decompression means for decompressing the interior of the oil tank 1 to a desired reduced pressure. The valve 14 is connected through a vacuum controller 17 to a vacuum gauge 16 provided on the lid 2. The state of decompression in the tank 1 is controlled by the vacuum controller 17.

This batch type apparatus operates in the manner described hereinunder.

Firstly, the lid 2 of the oil tank 1 is opened and the handle 6 is rotated to lift the retainer 3 above the oil surface. Then, the cover of the retainer 3 is opened and the food material to be fried is put in the retainer 3, followed by the closing of the retainer cover. Meanwhile, the oil in the oil tank 1 is circulated through the circulating pipe 9 by means of the pump 7, while being heated by the heater 8 up to the desired temperature which is lower than the boiling point of water. Subsequently, the handle 6 is rotated to immerse the retainer 3 in the oil, and the food material is held in the oil until it is heated uniformly.

During the uniform heating, the oil temperature is maintained at a constant level by the temperature sensor 10, oil temperature controller 11 and the heater 8. The control of the oil temperature is continued until the oil-frying is completed.

After every portion of the food material in the retainer 3 has been heated uniformly to a substantially equal temperature, the lid 2 of the oil tank is closed, the valve 14 is closed and the vacuum pump 12 is started thereby to rapidly decompress the interior of the oil tank 1. Then, the level of the reduced pressure in the oil tank 1 is controlled by use of the vacuum gauge 16, vacuum controller 17 and the valve 14.

The vapor generated during the oil-frying is condensed into liquid phase by the cold trap 13 and is then discharged.

After the frying in the oil, the handle 6 is rotated to lift the retainer 3 above the oil surface. Then, after restoring the normal pressure in the oil tank 1, the lid 2 is opened to permit the operator to take the fried food product out of the retainer 3.

Figure 2:
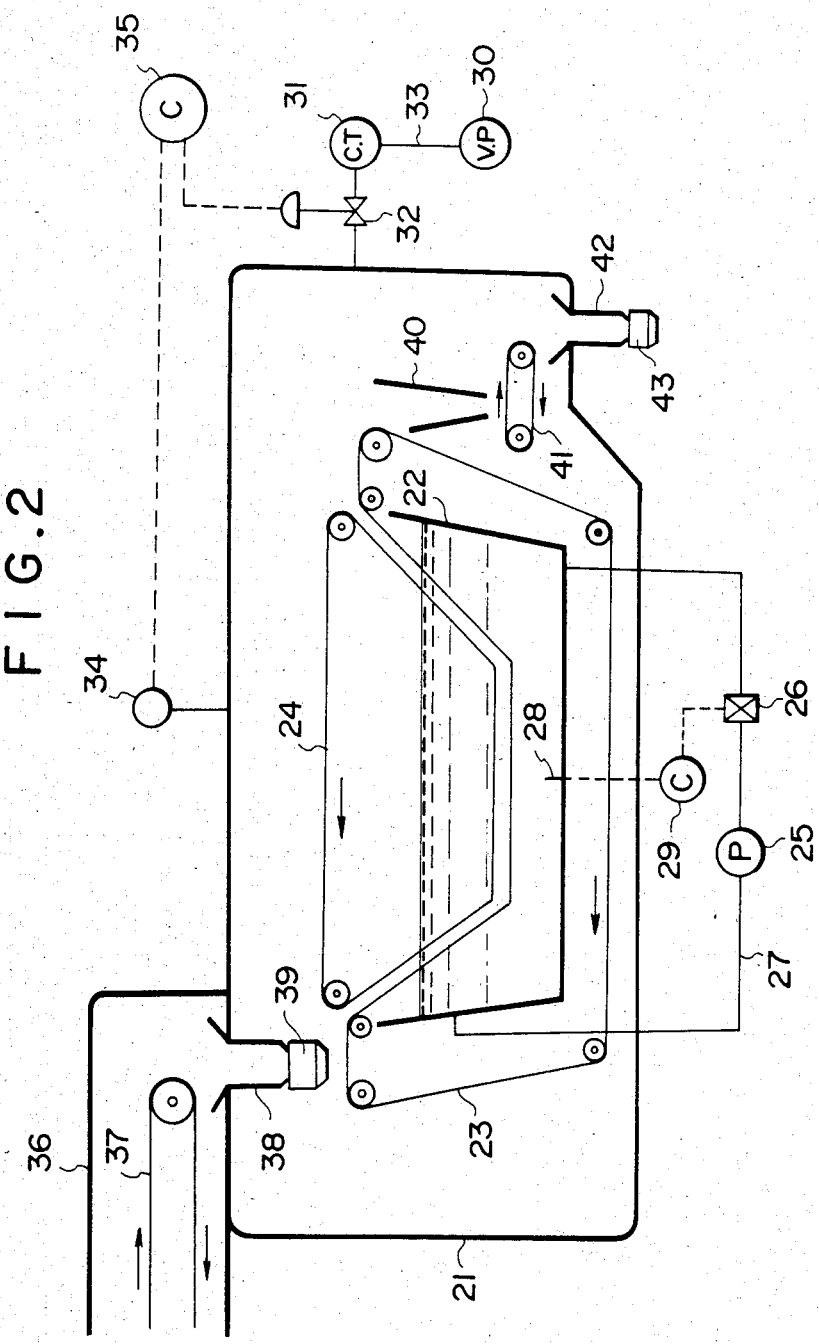

FIG. 2 shows a practical example of the continuous type apparatus. This apparatus has a vacuum chamber 21 in which an oil tank 22 is installed. The oil tank 22 is provided with net conveyors 23 and 24 for conveying the fried products. A pump 25 for recirculating the oil from the bottom of the tank 22 to one side of the same and a heater 26 for heating the oil tank 22 are in a same line with an oil tank temperature controller 29 to a temperator sensor 28 provided on the bottom of the oil tank 1, thereby to constitute means for controlling the oil temperature. A decompression means constituted by a vacuum pump 30, cold trap 31 and a valve 32 is connected to one side wall of the vacuum chamber 21 through a pipe 33. This decompression means serves to decompress the interior of the vacuum chamber 21 to a desired reduced pressure. The valve 32 is connected through a vacuum controller 35 to a vacuum gauge 34 provided on an upper portion of the vacuum chamber 21 so as to constitute a means for adjusting the level of the vacuum in the vacuum chamber 21.

A uniform-heating chamber 36 is mounted on the vacuum chamber 21. The chamber 36 accommodates a conveyor 37 for conveying the food material and a hopper 38 for supplying the food material into the vacuum chamber 21. An air lock valve 39 is mounted on the end of the hopper 38 in the vacuum chamber 21. A hopper 42 for discharging the fried food products and an air-lock valve 43 are provided in the lower portion of the vacuum chamber 21. The hopper 42 is adapted to receive the fried food products.

This continuous type apparatus operates in a manner described hereinunder. As the first step, the food material is uniformly heated in the uniform-heating chamber 37, while the interior of the vacuum chamber 21 is decompressed by means of the vacuum pump 30 down to a predetermined reduced pressure. Meanwhile, the oil in the oil tank 22 in the vacuum chamber 21 is circulated by the pump 25 through a circulating pipe 27, while being heated by the heater 26 up to a desired temperature which is lower than the boiling point of water.

The food material thus heated uniformly is then supplied to the net conveyor 23 in the vacuum chamber 21, through the hopper 38 and the air-lock valve 39, by means of the conveyor 37. The food material is then introduced by the net conveyors 23 and 24 into the oil so as to be fried in the latter. The fried food material is then supplied to a conveyor 41 through a hopper 40, and is taken as the product out of the apparatus through the hopper 42 and the air lock valve 43.

In the course of the treatment of the food material in the described manner, the vacuum in the vacuum chamber 21 is observed and controlled by means of the vacuum gauge 34, vacuum controller 35 and the valve 32, while the temperature of the oil in the oil tank 22 is maintained constant by the temperature sensor 28, oil temperature controller 29 and the heater 26.

Some practical examples of the method in accordance with the invention will be described hereinunder.

EXAMPLE 1

A snack made from the eyes of scallops was produed by the following method, employing the apparatus explained in connection with FIG. 1. With the lid 2 opened, the oil in the oil tank 1 was heated to 90° C. by means of the heater 8 and then the handle 6 was rotated to lift the retainer 3 above the oil surface. Subsequently, the eyes of scallops, having a substantially cylindrical shape of 30 mm dia. and 10 mm height and a water content of about 74.2%, were put in the retainer 3. After closing the cover of the retainer 3, the handle 6 was reversed to immerse the retainer 3 in the oil. The eyes were held in this state for 5 minutes, while the oil temperature was maintained at 90° C. so that each eye was heated uniformly throughout to 90° C, Subsequently, after closing the lid 2 and opening the valve 14, the vacuum pump 12 was started to reduce the pressure down to 1 torr. in 55 seconds. The material was held in this state for 18 minutes so as to be fried in the oil. Meanwhile, the oil temperature was maintained at 90° C. by means of the oil temperature controller 11, while the vacuum in the oil tank 1 was maintained at 1 torr. by the operation of the vacuum controller 17. Upon completing the oil-frying, the handle 6 was rotated to lift the retainer 3 from the oil bath and, after separating the liquid oil, normal pressure was restored in the oil tank 1. Finally, eyes of scallops having a water content of 5.6% were taken as the final product from the retainer 3, after opening the lid 2. The snack food thus produced had a tender but crisp texture, as well as good flavor peculiar to the eyes of scallops.

EXAMPLE 2

Oil-fried dry meat was produced by the following method, employing the apparatus explained in connection with FIG. 1. With the lid 2 opened, the oil in the oil tank 1 was heated up to 98° C. by means of the heater 8, and the handle 6 was rotated to lift the retainer 3 above the oil surface. Lumps of ham, in the form of small cubes measuring 10 cm wide, 10 cm long and 10 mm high, were put into the retainer 3. After closing the cover 2, the retainer was immersed in the oil by reversing the rotation of the handle 6. Keeping the oil temperature at 98° C., the cubes were held in the oil for 3 minutes so that each lump were uniformly heated throughout up to 98° C. Then, after closing the lid 2, the valve 14 was opened and the vacuum pump was started to reduce the pressure down to 5 torr. in 60 seconds. The cubes of ham were fried in this state for 15 minutes. Meanwhile, the oil temperature was maintained at 98° C. automatically by the operation of the oil temperature controller 11. The pressure in the oil tank 1 also was maintained automatically at 5 torr. by the operation of the vacuum controller 17.

After the frying, the handle 6 was rotated to lift the retainer 3 again, while normal pressure in water gradually restored the oil tank 1. Then, the fried dry meat, having a water content of 5.3%, was taken out of the retainer 3 after opening the lid 3. The thus produced dry meat was restored to tasty, firm cubes of pork, by soaking in hot water for 3 minutes. Thus, this dried meat can suitably be used as an ingredient for instant noodles.

EXAMPLE 3

Banana chips were produced by the following method, employing the apparatus explained before in connection with FIG. 1. With the lid 2 opened, the oil in the oil tank 1 was heated up to 95° C. by means of the heater 8, and the handle 6 was rotated to lift the retainer 3 above the oil surface. Subsequently, 200 g of sliced banana was put in the retainer 3 which was then immersed in the oil by reversing the rotation of the handle 6. The sliced banana was held in this state for 5 minutes while the oil temperature was maintained at 95° C. so that each slice was heated uniformly throught up to 95° C. Then, after closing the lid 2 and opening the valve 14, the vacuum pump 12 was started to reduce the pressure in the oil tank 1 down to 1 torr. The banana was then fried in the oil under this reduced pressure. During the frying, the oil temperature was automatically controlled at 95° C. by means of the oil temperature controller 11, while the pressure in the oil tank 1 was held at the reduced level of 1 torr. by the operation of the vacuum controller 17. Upon completion of the frying, the retainer 3 was lifted again above the oil surface by the handle 6 and, after the separation of the liquid oil, the pressure in the oil tank was gradually increased to normal pressure. Thereafter, the lid 2 was opened to permit the banana chips to be taken out of the retainer 3. The thus obtained banana chips were well expanded and had a moderately crisp texture.

EXAMPLE 4

Instant noodles were produced by the following method, employing the apparatus explained in connection with FIG. 1. With the lid 2 opened, the oil in the oil tank 1 was heated to 100° C. by the heater 8, and the handle 6 was rotated to lift the retainer 3 above the oil surface. Then, 230 g of steamed noodles, prepared by a known method, was put in the retainer 3 which was then immersed in the oil by the handle 6. The noodles were held in this state for 8 minutes, during which the oil temperature was maintained at 100° C. so that every noodle was uniformly heated throught up to 100° C. Then, after closing the lid 2 and opening the valve 14, the vacuum pump 12 was started to reduce the pressure in the oil tank down to 4 torr. in 40 seconds. The noodles were then fried for 5 minutes in the oil under this reduced pressure. During the frying, the oil temperature was maintained at 100° C. automatically by the oil temperature controller 11. Then, the oil temperature was raised to 120° C. in 3 minutes and the noodles were held at this elevated temperature for 2 minutes to complete the decompression frying. Meanwhile, the pressure in the closed oil tank 1 was maintained at the reduced level of 4 torr. by means of the vacuum controller 17. After the completion of the oil-frying, the handle was rotated to again lift the ratainer above the oil surface and normal pressure was gradually restored in the oil tank 1. Finally, the oil-fried noodles were taken out from the retainer after the opening of the lid 2. The fried noodles thus obtained showed a pleasant light yellow color and could be converted to edible noodles by soaking in hot water for a shorter period of time than the conventional instant noodles. Thus, the fried noodles produced by the method of the invention are quite suitable as an instant food.

EXAMPLE 5

In this example, a frying apparatus having the following construction was used. Namely, the apparatus had a frying chamber having therein an oil tank and a retainer movable up and down into and out of the oil tank, as well as a heating mechanism for heating the retainer. The frying chamber was sealed hermetically, except when opened for putting the food into and taking it out of the same. The apparatus also had a pressure adjusting mechanism for adjusting the pressure in the frying chamber to a level equal to or above or below atmospheric pressure as desired.

The retainer, while it is placed outside the oil tank in the frying chamber, was filled with 5 mm thick ring-shaped sliced onion having a water content of 89.1%. Then, the pressure of the atmosphere in the frying chamber was raised to 2 atm. The retainer was then immersed for 5 minutes in the oil which was maintained at 120° C. to uniformly heat the sliced onion. As a result, the sliced onion was heated uniformly up to 119° C. Subsequently, the atmosphere in the chamber was decompressed down to 10 torr. in one minute and the sliced onion was further dried for 10 minutes under this reduced pressure to become expanded dried onion having a water content of 3.5%. The onion was uniformly and highly expanded and had a tender but crisp texture, as well as pleasant flavor, with slight browning. Thus, this product can suitably be served as a snack food.

EXAMPLE 6

A mixture was formed by uniformly blending 35 parts of potato starch, 30 parts of alpha starch, 26 parts of dried mashed potato, 1 part of salt, 1 part of shortening oil and 7 parts of dried white of egg. Then, with the addition of 53 parts of water, the mixture was stirred to become a dough. The dough was then extruded by an extruder to become twisted pellets 1.5 mm thick, 30 mm long and 10 mm. wide. Subsequently, the pellets were dried by hot air at 60° C. for 10 hours to become dried pellets 1.2 mm thick, 25 mm long and 8 mm wide, having a water content of 11.5%.

The pellets thus obtained were put in the retainer while the latter was placed outside the oil tank in the frying chamber, and the pressure of the atmosphere in the frying chamber was increased to 20 atm. Thereafter, the retainer was held in the oil tank filled with oil of 180° C. for 1 minute to uniformly heat the pellets. In consequence, the pellets were uniformly heated up to 175° to 178° C.

Subsequently, the atmosphere in the chamber was rapidly decompressed to normal pressure in 7 seconds, and frying was conducted for 25 seconds under the normal pressure to obtain an expanded dried food product having a water content of 2%.

The thus obtained dried food product was highly expanded to show a uniform and smooth surface without any hard core therein. The food product was also lightly browned to an appetizing color and had a pleasing flavor, making it a food food.

EXAMPLE 7

The retainer, while placed outside the oil tank in the frying chamber, was filled with unboned chicken (water content 71%) covered by about 100 g of "tempura" wheat powders. The atmosphere in the frying chamber was then pressurized to 3.8 atm. while uniformly heating the chicken by a heating mechanism mounted in the chamber. As a result of 7 minute's uniform heating, the chicken was heated up to an even temperature of 141° C.

Subsequently, the retainer was immersed in the oil filling the oil tank which was heated to 151° C. Thereafter, the atmosphere in the chamber was rapidly decompressed to 1.4 atm. and under this reduced pressure, the chicken was fried for 6 minutes and 30 seconds to become tender dry chicken. The dried chicken thus produced showed a dry fried surface. In addition, the protein (muscular fibers) was sufficiently denatured and tenderized by the heat as a result of the uniform heating at the high temperature and the frying in hot oil, so as to create a tender and tasty texture. The flavor was also improved due to the denaturing of the protein, which produces a good flavor and also due to the extraction of a tasty component from the bones.

What is claimed is:

1. A decompression oil-frying method for producing a food product comprising:
   (a) uniformly heating a food material under a first pressure $P_1$ between atmospheric pressure and a pressure higher than atmospheric pressure, up to a temperature $T_1$ which is lower than the boiling point of water in the food material under said first pressure $P_1$, said temperature $T_1$ not causing the evaporation of the water in the food material;
   (b) rapidly decompressing said first pressure $P_1$ down to a second pressure $P_2$ under which the boiling point of the water is below said temperature $T_1$ and then immediately frying said food material in an oil held at a temperature $T_2$ substantially equal to said temperature $T_1$ and under said pressure $P_2$, whereby the water contained in said food material is rapidly evaporated to substantially uniformly dry said food material; and
   (c) restoring atmospheric pressure around said food material after the food material is removed from the oil.

2. A decompression oil-frying method according to claim 1, wherein the decompression from said first pressure $P_1$ to said second pressure $P_2$ is conducted within 3 minutes.

3. A decompression oil-frying method according to claim 1, wherein said temperature $T_1$ of the food material is above the boiling point of water under said second pressure $P_2$ by at least about 5° C.

4. A decompression oil-frying method according to claim 1, wherein the difference between said temperature $T_1$ of the food material and said temperature $T_2$ of the oil is not more than about 10° C.

5. A decompression oil-frying method according to claim 1, wherein the difference between said temperature $T_1$ of the food material and said temperature $T_2$ of the oil is not more than about 5° C.

6. A decompression oil-frying method according to claim 1, wherein the decompression from said first pressure $P_1$ to said second pressure $P_2$ is conducted within 1 minute.

7. A decompression oil-frying method for producing a food product comprising:
   (a) uniformly heating a food material by immersing in a heated oil under a first pressure $P_1$ between atmospheric pressure and a pressure higher than atmospheric pressure, up to a temperature $T_1$ which is lower than the boiling point of water in the food material under said first pressure $P_1$, said temperature $T_1$ not causing the evaporation of the water in the food material;

(b) rapidly decompressing said first pressure $P_1$ down to a second pressure $P_2$ under which the boiling point of the water is below said temperature $T_1$ and then immediately frying said food material in the heated oil held at a temperature $T_2$ substantially equal to said temperature $T_1$ and under said pressure $P_2$, whereby the water contained in said food material is rapidly evaporated to substantially uniformly dry said food material; and (c) restoring atmospheric pressure around said food material after the food material is removed from the oil.

8. A decompression oil-frying method according to claim 7, wherein the decompression from said first pressure $P_1$ to said second pressure $P_2$ is conducted within 3 minutes.

9. A decompression oil-frying method according to claim 7, wherein said temperature $T_1$ of the food material is above the boiling point of water under said second pressure $P_2$ by at least about 5° C.

10. A decompression oil-frying method according to claim 7, wherein the difference between said temperature $T_1$ of the food material and said temperature $T_2$ of the oil is not more than about 10° C.

11. A decompression oil-frying method according to claim 7, wherein the difference between said temperature $T_1$ of the food material and said temperature $T_2$ of the oil is not more than about 5° C.

12. A decompression oil-frying method according to claim 7, wherein the decompression from said first pressure $P_1$ to said second pressure $P_2$ is conducted within 1 minute.

13. A decompression oil-frying method for producing a food product comprising:

(a) uniformly heating a food material in a uniform-heating chamber under a first pressure $P_1$ between atmospheric pressure and a pressure higher than atmospheric pressure, up to a temperature $T_1$ which is lower than the boiling point of water in the food material under said first pressure $P_1$, said temperature $T_1$ not causing the evaporation of the water in the food material;

(b) introducing the food material from the uniform-heating chamber into oil in an oil tank which is adjusted to a second pressure $P_2$ under which the boiling point of the water is below said temperature $T_1$ and frying said food material in the oil held at a temperature $T_2$ substantially equal to said temperature $T_1$ and under said pressure $P_2$, whereby the water contained in said food material is rapidly evaporated to substantially uniformly dry said food material; and (c) restoring atmospheric pressure around said food material after the food material is removed from the oil.

14. A decompression oil-frying method according to claim 13, wherein said temperature $T_1$ of the food material is above the boiling point of water under said second pressure $P_2$ by at least about 5° C.

15. A decompression oil-frying method according to claim 13, wherein the difference between said temperature $T_1$ of the food material and said temperature $T_2$ of the oil is not more than about 10° C.

16. A decompression oil-frying method according to claim 13, wherein the difference between said temperature $T_1$ of the food material and said temperature $T_2$ of the oil is not more than about 5° C.

* * * * *